United States Patent
Xing et al.

(10) Patent No.: US 11,576,140 B2
(45) Date of Patent: Feb. 7, 2023

(54) TRANSMISSION TIMING DETERMINATION METHOD AND DEVICE AND COMPUTER-READABLE STORAGE MEDIUM

(71) Applicant: ZTE CORPORATION, Guangdong (CN)

(72) Inventors: Weimin Xing, Guangdong (CN); Youxiong Lu, Guangdong (CN); Feng Bi, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 45 days.

(21) Appl. No.: 17/280,478

(22) PCT Filed: Sep. 17, 2019

(86) PCT No.: PCT/CN2019/106259
§ 371 (c)(1),
(2) Date: Mar. 26, 2021

(87) PCT Pub. No.: WO2020/063405
PCT Pub. Date: Apr. 2, 2020

(65) Prior Publication Data
US 2021/0345273 A1    Nov. 4, 2021

(30) Foreign Application Priority Data
Sep. 28, 2018    (CN) .......................... 201811142586.X

(51) Int. Cl.
*H04W 56/00* (2009.01)
*G01S 19/05* (2010.01)

(52) U.S. Cl.
CPC ........... *H04W 56/006* (2013.01); *G01S 19/05* (2013.01); *H04W 56/001* (2013.01); *H04W 56/005* (2013.01)

(58) Field of Classification Search
CPC . H04W 56/00; H04W 56/001; H04W 56/006; H04W 56/0015; H04W 56/0045; H04W 56/005
See application file for complete search history.

(56) References Cited

U.S. PATENT DOCUMENTS

2018/0242268 A1    8/2018 Rune et al.
2019/0110268 A1*   4/2019 Abedini .............. H04W 56/002
(Continued)

FOREIGN PATENT DOCUMENTS

CN    101904205 A    12/2010
CN    102088763 A    6/2011
(Continued)

OTHER PUBLICATIONS

AT&T. "R1-1809941: Summary of 7.2.3.1 Enhancements to Support NR Backhaul Links." 3GPP TSG RAN WG1 Meeting #94., Aug. 24, 2018, chapter 3.3.
(Continued)

*Primary Examiner* — Pao Sinkantarakorn
(74) *Attorney, Agent, or Firm* — KDB Firm PLLC

(57) ABSTRACT

Disclosed are a transmission timing determination method, a transmission timing determination device, and a computer-readable storage medium. First timing adjustment information issued by a first node is received, and a first transmission timing of a second node is adjusted according to the first timing adjustment information, or a global navigation satellite system (GNSS) timing is used as the first transmission timing; and an adjustment manner of the first transmission timing is determined according to synchronization type indication information.

15 Claims, 4 Drawing Sheets

---

Determine a timing synchronization type to be used according to its own decision or network configuration — S201

The first node issues first timing adjustment information to the second node, or instructs the second node to use the GNSS timing as a first transmission timing of the second node — S202

(56) References Cited

U.S. PATENT DOCUMENTS

| | | | |
|---|---|---|---|
| 2021/0014816 A1* | 1/2021 | Bendlin | H04W 56/0015 |
| 2021/0250884 A1* | 8/2021 | Iyer | H04W 56/0045 |
| 2022/0070809 A1* | 3/2022 | Song | H04W 56/0045 |

FOREIGN PATENT DOCUMENTS

| | | |
|---|---|---|
| CN | 105453625 A | 3/2016 |
| CN | 105453667 A | 3/2016 |
| EP | 2568755 A1 | 3/2013 |
| EP | 2568755 B1 | 7/2014 |
| JP | 2018528702 A | 9/2018 |
| WO | 2013129672 A1 | 9/2013 |
| WO | 2016181198 A1 | 11/2016 |
| WO | 2017049521 A1 | 3/2017 |

OTHER PUBLICATIONS

International Search Report for the International Patent Application No. PCT/CN2019/106259, dated Nov. 26, 2019, 2 pages.

First Office Action issued in CN201811142586.X, dated Nov. 26, 2021, fifteen (15) pages.

First Search Report issued in CN201811142586.X, three (3) pages.

European Search Report for application No. 19866968.1, dated Jun. 1, 2022 (nine (9) pages).

Examination Report for Indian Patent Application No. 202127019270, dated May 19, 2022 (five (5) pages).

Notice of Reasons for Refusal for Japanese Patent Application No. 2021-517383, dated Jun. 3, 2022 (16 pages).

Notification of Reasons for Refusal for Korean Patent Application No. 10-2021-7012940, dated Jun. 17, 2022 (five (5) pages).

English Translation of Notification of Reasons for Refusal for Korean Patent Application No. 10-2021-7012940, dated Jun. 17, 2022 (six (6) pages).

Nokia et al., "IAB timing", 3GPP TSG RAN WG1 Meeting #92bis; R1-1804624. Sanya, P.R. China, Apr. 16-Apr. 20, 2018.

Huawei, HiSilicon, "On IAB node synchronization and timing alignment", 3GPP TSG RAN WG1 Meeting #94; R1-1808087. Gothenburg, Sweden, Aug. 20-24, 2018.

Qualcomm Incorporated, "Network synchronization for multi-hop IAB",3GPP TSG RAN WG1 Meeting #94; R1-1809445. Gothenburg, Sweden, Aug. 20-Aug. 24, 2018.

* cited by examiner

TRANSMISSION TIMING DETERMINATION METHOD AND DEVICE AND COMPUTER-READABLE STORAGE MEDIUM

CROSS-REFERENCE TO RELATED APPLICATIONS

This application is a U.S. National Stage Application, filed under 35 U.S.C. 371, of International Patent Application No. PCT/CN2019/106259, filed on Sep. 17, 2019, which claims a priority to a Chinese Patent Application No. 201811142586.X filed with the CNIPA on Sep. 28, 2018, disclosures of which are incorporated herein by reference in their entireties.

TECHNICAL FIELD

Embodiments of the present disclosure relate to, but are not limited to, the technical field of 5G new radio (NR) wireless communications.

BACKGROUND

One goal of the demand for wireless communications is to pursue communication with anyone at anywhere and anytime, which requires good coverage of a wireless network. Therefore, an important topic of the wireless technology is to improve the flexibility of cell layout and the system capacity while ensuring coverage. However, this flexibility may often require more investment in the infrastructure, so that the wireless relay is considered to be a scheme for expanding the coverage and improving the system capacity in consideration of the cost. In a 3GPP release10 stage relay technology, a relay node (RN) is connected to a base station by wireless to realize a backhaul, and provides, in role of "base station", services for a subordinate terminal. In such two-hop network, "a backhaul link from the RN to the base station" and "an access link from the RN to the terminal" are multiplexed in time division manner (TDM) due to the limitation of factors such as self-interference and duplex mode of the RN, and space division multiplexing (SDM) and frequency division multiplexing (FDM) are not supported. In a current fifth generation (5G) wireless communications system standardization discussion, integrated access and backhaul (IAB) technology is proposed. A node that supports IAB may be referred to as an IAB node, which is different from Release 10 RN. IAB may support multi-hop networks and more flexible multiplexing manners (TDM/FDM/SDM).

SUMMARY

On one aspect, the present disclosure provides a transmission timing determination method, which may include: issuing, by a first node, first timing adjustment information to a second node, wherein the first timing adjustment information is used for adjusting a first transmission timing of a second node, or instructing, by the first node, the second node to use a global navigation satellite system (GNSS) timing as the first transmission timing of the second node. The first transmission timing is a downlink transmission timing of the second node.

On another aspect, the present disclosure further provides a transmission timing determination method, which may include: receiving, by a second node, first timing adjustment information transmitted by a first node, and adjusting a first transmission timing of the second node according to the first timing adjustment information, or using, by the second node, a global navigation satellite system (GNSS) timing as the first transmission timing of the second node. The first transmission timing is a downlink transmission timing of the second node.

On another aspect, the present disclosure further provides a transmission timing determination device, which may include a transmission module. The transmission module is configured to: issue, through a first node, first timing adjustment information to a second node, wherein the first timing adjustment information is used for adjusting a first transmission timing of the second node; and/or issue, through the first node, synchronization type indication information to the second node, wherein the synchronization type indication information comprises at least one of a global navigation satellite system (GNSS) timing or an over the air (OTA)/base station timing, and the synchronization type indication information is used for determining an adjustment manner of the first transmission timing. The first node is a parent node of the second node, and the first transmission timing is a downlink transmission timing of the second node.

On another aspect, the present disclosure further provides a transmission timing determination device, which may include a receiving module, which is configured to: receive first timing adjustment information transmitted by a first node, and adjust a first transmission timing of a second node according to the first timing adjustment information; or use a global navigation satellite system (GNSS) timing as the first transmission timing. The first transmission timing is a downlink transmission timing of the second node.

On another aspect, the present disclosure further provides a communication device, which may include a processor, a memory, a communication unit, and a communication bus. The communication bus is configured to implement a wireless communication connection among the processor, the communication unit and the memory. The processor is configured to execute one or more first programs stored in the memory, to implement steps of the transmission timing determination method described herein. The processor is configured to execute one or more second programs stored in the memory, to implement steps of the transmission timing determination method described herein.

On another aspect, the present disclosure further provides a computer-readable storage medium, storing one or more first computer programs and one or more second computer programs. The one or more first computer programs are executable by one or more processors, to implement steps of the method described herein. The one or more second computer programs are executable by the one or more processors, to implement steps of the method described herein.

DETAILED DESCRIPTION

In order to clarify the objects, technical solutions, and advantages of the present disclosure, embodiments of the present disclosure are detailed hereinafter according to specific implementations in conjunction with drawings. It should be understood that the specific embodiments described herein are merely intended to explain the present disclosure and are not intended to limit the present disclosure.

Figure 1:
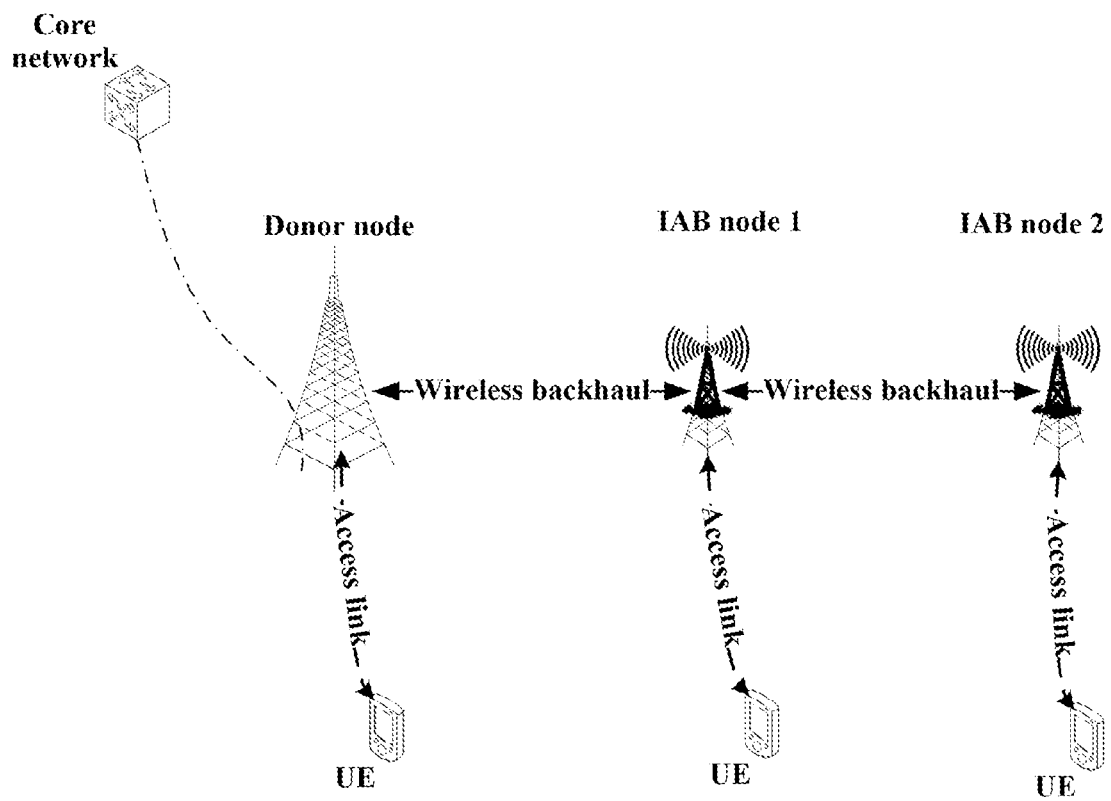
FIG. 1 is a schematic structural diagram of a typical multi-hop network under an JAB technology.

For a multi-hop network under IAB technology, a typical structure is shown in FIG. 1. A node having a direct connection (e.g., a wired connection) with a core network is referred to as an IAB donor, or a donor node, which may obtain downlink data or transmit uplink data to the core network. An IAB node is wirelessly connected to its associated parent IAB node, e.g., in FIG. 1, the parent IAB node of an IAB node 2 is an IAB node 1, and the parent IAB node of the IAB node 1 is the donor node. The IAB node is accessed to the present IAB node in a UE-like manner.

Both the IAB donor and the IAB node support terminal (UE) access. In order to prevent IAB nodes of different hops from interfering with each other when serving the UE, it is very important to keep all IAB nodes (including donor node) synchronized with each other. A simple way to maintain synchronization is to use over the air (OTA) for synchronization. For example, under a traditional timing advance (TA) mechanism, a base station adjusts an uplink transmission timing of the UE, and a TA value is twice a propagation delay. For the IAB node to be synchronized with the parent, that is, a downlink timing of the IAN node is to be aligned with that of the parent, the IAB node needs to advance its own downlink transmission timing, an advance amount is half of a TA value indicated by a parent node; in this way, a traditional TA mechanism may be used to determine a transmission timing of the IAB node as a child node or a UE communicating with the parent node, and a transmission timing of the IAB node as a base station serving its child node or UE subordinate to the IAB node. However, in a scenario that supports FDM or SDM, it is required that the IAB node may simultaneously receive downlink data of the parent node and uplink data of the child node or the UE, and/or transmit data to the parent node and the child node or the UE at the same time. In order to support the FDM or the SDM, it will have an impact on the traditional TA mechanism. For example, the TA value may no longer be twice the propagation delay. At this time, a traditional TA process may not meet the requirements of OTA synchronization and the FDM or the SDM at the same time. In addition, a synchronization process must also consider a scenario where the IAB node has global navigation satellite system (GNSS) timing capabilities.

Therefore, the present disclosure particularly provides transmission timing determination method and device and a computer-readable storage medium, which substantially avoid one or more of problems caused by disadvantages and limitations of related technologies.

Figure 2:
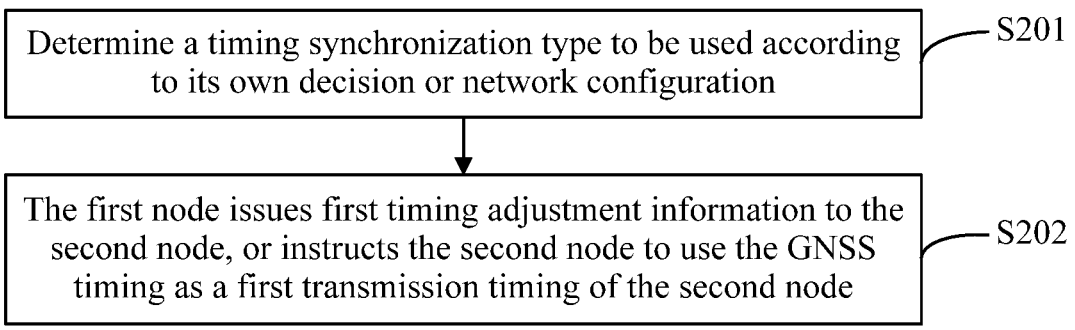
FIG. 2 is a flowchart of a transmission timing determination method based on a parent node side according to an embodiment of the present disclosure.

FIG. 2 is a transmission timing determination method based on a parent node side provided by an embodiment of the present disclosure. In the embodiment, a parent node is referred to as a first node, a child node under the parent node is referred to as a second node, and a terminal UE disposed under the parent node or a terminal UE disposed under the child node is referred to as a subordinate device. In the embodiment, there may be multiple second nodes. The multiple second nodes may be all connected to the parent node, or may be connected sequentially in form of a chain.

In the embodiment, the transmission timing determination method on the parent node side is mainly a process of transmitting a synchronization adjustment timing for realizing a bidirectional transmission timing to a subordinate node or a terminal of the parent node. The method may include step S201 and step S202.

In step S201, the first node determines, according to a decision of the first node or network configuration, a timing synchronization type to be issued.

For example, the timing synchronization type may include a global navigation satellite system (GNSS) timing and/or an over the air (OTA)/base station timing.

In practical applications, not all nodes or terminals support a GNSS timing type, but all nodes or terminals support an OTA/base station timing type, and of the two timing types, the GNSS timing type may be preferred. At this time, in synchronization type indication information issued by the first node, the transmission is performed with a highest priority of a GNSS or it is indicated that the synchronization type is the GNSS timing. If the first node does not support the GNSS or the first node itself does not want to use the GNSS, or the network configuration indicates not to use the GNSS or the parent node of the first node is configured to not use the GNSS, then it will not transmit the synchronization type indication information with the highest priority of the GNSS. For example, the OTA/base station timing type is used as the highest priority or it is indicated that the synchronization type is the OTA/base station timing, and meanwhile, the synchronization type indication information is also notified to the second node or the terminal, so that a timing between the two is ensured to be normal.

In step S202, the first node issues first timing adjustment information to the second node, or instructs the second node to use the GNSS timing as a first transmission timing of the second node.

In the embodiment, the first timing adjustment information is used for adjusting the first transmission timing of the second node, and the synchronization type indication information includes at least one of the global navigation satellite system (GNSS) timing or the over the air (OTA)/base station timing; the synchronization type indication information is used for determining an adjustment manner of the first transmission timing, the first node is a parent node of the second node, and the first transmission timing is a downlink transmission timing of the second node.

In the embodiment, the first timing adjustment information is mainly aimed at when the first node adjusts in a manner of the OTA/base station timing, the first node directly issues the first timing adjustment information; however, when the first node adjusts in a manner of the GNSS timing, the first node issues a GNSS timing type, and directly instructs the second node to use the GNSS timing as the first transmission timing.

Further, it may also be implemented in a manner of issuing the synchronization type indication information. When the first node supports two timing manners (namely, the GNSS timing and the OTA/base station timing), the first node will issue the synchronization type indication information, and the timing manner is determined through the synchronization type indication information. If it is determined that the OTA/base station timing manner is used for adjustment, the first node directly issues the first timing adjustment information. If it is determined that the GNSS timing type is used, the first node directly instructs the second node to use the GNSS timing as the first transmission timing.

In practical applications, the synchronization type indication information may also be used for indicating a timing synchronization type currently used on the first node, and the second node determines a timing synchronization type or mode of the second node according to the synchronization type indication information.

A method for determining the first transmission timing and/or a second transmission timing of the second node according to the determined timing synchronization type or mode, the first node being the parent node of the second node, is just a method for controlling timing adjustment of an uplink transmission timing or the downlink transmission timing of the second node.

In the embodiment, the first transmission timing is the downlink transmission timing of the second node, and the second transmission timing is the uplink transmission timing of the second node.

The timing synchronization type is present in the synchronization type indication information in one of following manners: a GNSS enable flag, information indicating timing synchronization type, or information indicating synchronization type priority.

That is to say, when the first node issues the timing synchronization type, it will select to transmit in following three conditions: 1) a pushing is performed in a manner of the GNSS enable flag, this manner generally indicates whether the GNSS is used or not, in an exemplary embodiment, if the GNSS is indicated to be used and the second node supports the GNSS, then the second node may use the GNSS timing type, otherwise, the second node should select the OTA/base station type to use; or 2) a corresponding supported type is directly pushed, the corresponding type is selected according to the indication of the type; or a corresponding used type is directly pushed, in an exemplary embodiment, if the GNSS timing type is indicated and the second node supports the GNSS, then the second node may use the GNSS timing type, otherwise, the second node should select the OTA/base station type to use; or 3) a pushing is performed in a priority manner, this priority indicates the priority order of multiple timing synchronization types, and then the second node selects a manner supported by the second node itself according to the priority sequence so as to synchronously adjust the transmission timing with the first node. In an exemplary embodiment, the second node may also issue the timing synchronization type to its child nodes or terminals, and such synchronization type indication may be the same as the timing synchronization type indication issued by the first node.

In the embodiment, the second node may transmit or the terminal itself may transmit indication information indicating whether a certain synchronization type is supported, for example, capability information indicating whether the GNSS timing is supported, to the first node.

In the embodiment, when the first node issues the synchronization type indication information, after the second node receives the synchronization type indication information, if it is found that the second node or the terminal itself no longer supports the type indicated by the first node or that the indicated type is not available, then the method further includes: the first node receives a request message for changing the timing synchronization type from the second node or the terminal, and the request message may be pushed in a manner of GNSS state information or capability information; alternatively, in the embodiment, if the synchronization type indication information received at the second node is the GNSS, if the GNSS timing of the second node is not available at the beginning, the second node selects an OTA synchronization timing manner, but the second node finds afterwards that the GNSS becomes reliable and may be used, then the method further includes: the first node receives a request message for changing the timing synchronization type from the second node or the terminal, and the request message may be pushed in the manner of the GNSS state information or capability information. However, in the embodiment, it is not limited to push in the above two manners, as long as manners reflecting that the timing synchronization type needs to be changed may be embodied.

In an exemplary embodiment, the first node adjusts the timing synchronization type of the second node according to the request message, and feeds back a response message to the second node or the terminal, so that the second node or terminal learns to adjust, and finally, both the first node and the second node perform the synchronization adjustment of the transmission timing according to the adjusted type, and finally determine the transmission timing.

In the embodiment, the first timing adjustment information may include synchronization adjustment information, where the synchronization adjustment information includes one of following adjustment amounts: a first adjustment amount $\Delta T_a$ relative to a downlink receiving timing of a signal transmitted by the first node at the second node, a second adjustment amount $\Delta T_b$ relative to a second transmission timing of the second node, or a third adjustment amount $\Delta T_c$ relative to a current first transmission timing of the second node. Correspondingly, when the timing synchronization type is issued to adjust the first transmission timing of the second node, the adjustment may be made in following three manners.

Manner one: if the synchronization adjustment information is the first adjustment amount $\Delta T_a$, the downlink receiving timing $T_1$ is advanced according to a numerical value indicated in the first adjustment amount to obtain the first transmission timing, where the first transmission timing is $T_1 - \Delta T_a$.

Manner two: if the synchronization adjustment information is the second adjustment amount $\Delta T_b$, a current second transmission timing $T_2$ is adjusted by $\Delta T_b$ to obtain the first transmission timing, where the first transmission timing is $T_2 - \Delta T_b$.

Manner three: if the synchronization adjustment information is the third adjustment amount $\Delta T_c$, a current first transmission timing $T_{old}$ is adjusted by $\Delta T_c$ to obtain a first transmission timing, where the first transmission timing is $T_2 - \Delta T_c$, or an adjustment amount $\Delta T_{a,\ old}$ of the current first transmission timing is adjusted by $\Delta T_c$ to obtain a new adjustment amount $\Delta T_{a,\ new} = \Delta T_{a,\ old} + \Delta T_c$ of the first transmission timing, where the first transmission timing is $T_1 - \Delta T_{a,\ new}$.

According to the transmission timing determination method provided in the embodiment, the synchronization type indication information is issued to the second node or the terminal, and the second node is controlled through the synchronization type indication information to adjust the first transmission timing of the second node itself, so that the synchronization timing adjustment of the transmission timing among multiple terminals is realized, and so that in a 5G NR, the adjustment mechanism of the transmission timing between the nodes may not have mutual influence when the nodes realize simultaneous receiving or simultaneous transmitting; meanwhile, the data transmission efficiency of the IAB network and the utilization rate of distributed resources are also improved, the requirements of the nodes or the UE may be better met, and the user experience is improved. The solution is easy to implement and suitable for various different scenes.

Figure 3:
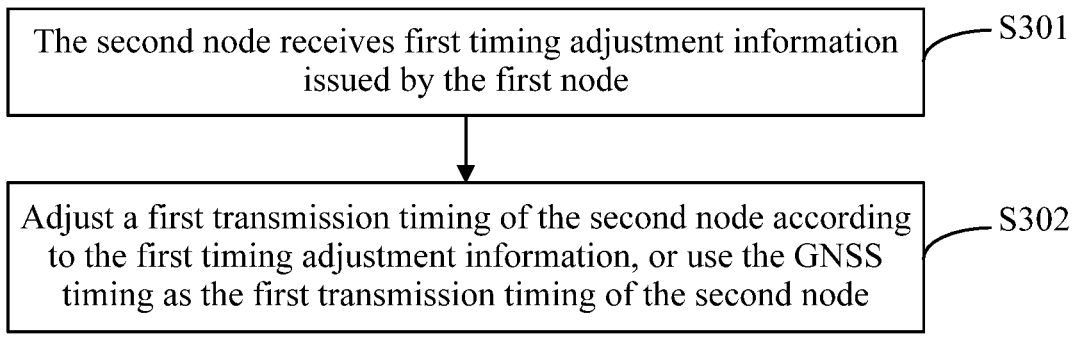
FIG. 3 is a flowchart of a transmission timing determination method based on a child node side according to an embodiment of the present disclosure.

FIG. 3 is a transmission timing determination method based on a child node side provided by an embodiment of the present disclosure. In the embodiment, a parent node is referred to as a first node, a child node under the parent node is referred to as a second node, and a terminal UE disposed under the parent node or a terminal UE disposed under the child node is referred to as a subordinate device. In the embodiment, there may be multiple second nodes. The multiple second nodes may be all connected to the parent node, or may be connected sequentially in form of a chain.

In the embodiment, the transmission timing determination method on the child node side is mainly a process of adjusting first transmission timing and/or second transmission timing of the child node according to synchronization type indication information issued by the first node (parent node), and transmitting a synchronization adjustment timing for realizing a bidirectional transmission timing to a subordinate node or a terminal of the child node. The method may include step S301 and step S302.

In step S301, the second node receives first timing adjustment information issued by the first node, or uses a GNSS timing.

In the step, an indication of a timing synchronization type may also be achieved by issuing the synchronization type indication information. In an exemplary embodiment, the indication is transmitted based on a condition that the first node supports two timing types, i.e., the GNSS timing and an OTA/base station timing at the same time, the synchronization type indication information is used for determining a timing synchronization type currently used by the first node, and the timing synchronization type includes global navigation satellite system (GNSS) timing and/or the over the air (OTA)/base station timing.

In the embodiment, the first timing adjustment information is mainly aimed at when the first node adjusts in a manner of the OTA/base station timing, the first node directly issues the first timing adjustment information; however, when the first node adjusts in a manner of the GNSS timing, the first node issues a GNSS timing type, and directly instructs the second node to use the GNSS timing as the first transmission timing.

Further, it may also be implemented in a manner of issuing the synchronization type indication information. When the first node supports two timing manners (namely, the GNSS timing and the OTA/base station timing), the first node will issue the synchronization type indication information, and the timing manner is determined through the synchronization type indication information. If it is determined that the OTA/base station timing manner is used for adjustment, the first node directly issues the first timing adjustment information. If it is determined that the GNSS timing type is used, the first node directly instructs the second node to use the GNSS timing as the first transmission timing.

Further, if the second node receives the synchronization type indication information indicating the GNSS timing, but the second node does not support GNSS or considers a GNSS to be not reliable, the second node may select to perform an interactive negotiation with the first node to re-determine a timing adjustment manner.

In practical applications, not all nodes or terminals support a GNSS timing type, but all nodes or terminals support an OTA/base station timing type, and in the two types, the GNSS timing type may be preferred. At this time, in the synchronization type indication information issued by the first node, the transmission is substantially performed with a highest priority of a GNSS or it is indicated that the synchronization type is the GNSS timing. If the first node does not support the GNSS or the first node itself does not want to use the GNSS, or the network configuration indicates not to use the GNSS or the parent node of the first node is configured to not use the GNSS, then it will not transmit the synchronization type indication information with the highest priority of the GNSS. For example, the OTA/base station timing type is used as the highest priority or it is indicated that the synchronization type is the OTA/base station timing, and meanwhile, the synchronization type indication information is also notified to the second node or the terminal, so that a timing between the two is ensured to be normal.

In step S302, a first transmission timing of the second node is adjusted according to the first timing adjustment information, or the GNSS timing is determined to be used as the first transmission timing of the second node.

The first transmission timing is a downlink transmission timing of the second node, and the second transmission timing is an uplink transmission timing of the second node.

In the embodiment, the second node may also be adjusted in a manner of the GNSS timing when adjusting the first transmission timing, i.e. the GNSS timing is directly used as the first transmission timing. The second node may determine to use the GNSS timing according to its own decision or network configuration.

In the embodiment, for the acquisition of the first timing adjustment information, the second node may determine a corresponding adjustment manner according to the synchronization type indication information after receiving the synchronization type indication information issued by the first node at first; if the adjustment manner is the GNSS timing, the GNSS timing is directly used as the first transmission timing; if the adjustment manner is the OTA/base station timing, the second node receives the first timing adjustment information issued by the first node, and adjusts the first transmission timing according to the first timing adjustment information.

In the embodiment, before the second node receives the first timing adjustment information transmitted by the first node or before the second node uses the GNSS timing as the first transmission timing of the second node, the method may further include: the second node receives the synchronization type indication information transmitted by the first node, a timing synchronization type using the GNSS timing is determined and/or a timing synchronization type using the OTA/base station timing is determined; a corresponding adjustment manner of the first transmission timing is determined according to the timing synchronization type; the step in which the first transmission timing of the second node is adjusted includes: the first transmission timing of the second node is adjusted according to the received first timing adjustment information in the adjustment manner, or the GNSS timing is used as the first transmission timing of the second node.

In the embodiment, if the first node issues the synchronization type indication information, the timing synchronization type is present in the synchronization type indication information in one of following manners: a GNSS enable flag, information indicating timing synchronization type, or information indicating synchronization type priority.

That is to say, when the first node issues the timing synchronization type, it will select to transmit in following three conditions: 1) a pushing is performed in a manner of the GNSS enable flag, however, this manner generally indicates whether the GNSS is supported or not, if the GNSS is not supported, then the second node may automatically select the OTA/base station type to use; or 2) a corresponding supported type is directly pushed, the corresponding type is selected according to the indication of the type; or 3) a pushing is performed in a priority manner, this priority is preferably in that a support manner of the first node is used as a highest priority, and then the second node selects a manner supported by the second node itself according to the priority sequence so as to synchronously adjust the transmission timing with the first node.

In the embodiment, after the second node receives the synchronization type indication information transmitted by the first node, determines the timing synchronization type using the global navigation satellite system (GNSS) timing and/or determines the timing synchronization type using the over the air (OTA)/base station timing, the method may further include: a corresponding adjustment manner of the first transmission timing is determined according to the timing synchronization type; and the first transmission timing is adjusted based on the adjustment manner.

In the embodiment, if the synchronization type indication information indicates the GNSS timing, then before the step S302, the method may further include: whether the second node itself supports the GNSS timing is determined; if supported, then the GNSS timing is used as the timing synchronization type for the downlink transmission timing of the second node; if not supported, then a request for adjusting the timing synchronization type into the OTA/base station timing to the first node is transmitted to the first node, and the request includes GNSS state information or capability information of the second node itself.

That is to say, if the synchronization type indication information indicates the timing synchronization type of the GNSS timing, and it is determined that the second node itself supports the GNSS timing, then the timing synchronization type using the GNSS timing is determined, and the GNSS timing is used as the first transmission timing of the second node; otherwise, the timing synchronization type using the OTA/base station timing is determined; the first timing adjustment information transmitted by the first node is received, and the first transmission timing of the second node is adjusted according to the first timing adjustment information.

For unsupported cases, when the first node issues the timing synchronization type, it will select to transmit in following three conditions: 1) a pushing is performed in a manner of the GNSS enable flag, this manner generally indicates whether the GNSS is used or not, in an exemplary embodiment, if the GNSS is indicated to be used and the second node supports the GNSS, then the second node may use the GNSS timing type, otherwise, the second node should select the OTA/base station type to use; or 2) a corresponding supported type is directly pushed, the corresponding type is selected according to the indication of the type; or a corresponding used type is directly pushed, in an exemplary embodiment, if the GNSS timing type is indicated and the second node supports the GNSS, then the second node may use the GNSS timing type, otherwise, the second node should select the OTA/base station type to use; or 3) a pushing is performed in a priority manner, this priority indicates the priority order of multiple timing synchronization types, and then the second node selects a manner supported by the second node itself according to the priority sequence so as to synchronously adjust the transmission timing with the first node. In an exemplary embodiment, the second node may also issue the timing synchronization type to its child nodes or terminals, and such synchronization type indication may be the same as the timing synchronization type indication issued by the first node.

In the embodiment, the second node may transmit or the terminal itself may transmit indication information indicating whether a certain synchronization type is supported, for example, capability information indicating whether the GNSS timing is supported, to the first node.

In a case where the second node itself supports the GNSS timing, the adjustment of the first transmission timing and the second transmission timing by the second node directly uses the GNSS timing as the first transmission timing or the second transmission timing, or the timing in the GNSS timing is set as the first transmission timing of the second node.

In the embodiment, if the timing synchronization type is the OTA/base station timing, the synchronization type indication information further includes information about the mode/type/manner of OTA/base station timing, that is, the OTA/base station timing may include multiple types.

In the embodiment, if the system or standard only supports the OTA/base station timing, then the first node no longer transmits the synchronization type indication information, and the second node adopts the OTA/base station timing manner by default. Or the system or standard sets a default timing synchronization type, if no synchronization type indication information is transmitted, then it is equivalent to indicating that the timing synchronization type is the default timing synchronization type. The default timing synchronization type may be the OTA/base station timing or the GNSS timing, and may also be a certain OTA/base station timing mode.

If the determined timing synchronization type is the OTA/base station timing or the OTA/base station timing is used by default, the step in which the first transmission timing is adjusted in a manner determined by the timing synchronization type indicated in the synchronization type indication information or in a manner of the OTA/base station timing includes: time adjustment information transmitted by the first node (parent node) is received, and the first transmission timing of the second node is adjusted according to the adjustment information.

In practical applications, manners of adjusting and determining the transmission timing of the node or the terminal are different in two manners of the GNSS timing and the OTA/base station timing, so that in the manner of the OTA/base station timing, time adjustment information for adjusting the transmission timing needs to be received from a superior node (parent node), and the first transmission timing of the second node or the terminal is adjusted according to the adjustment information.

In the embodiment, the adjustment information is obtained by receiving a first transmission timing adjustment message (e.g., first timing adjustment information) issued by the first node and used for indicating a downlink transmission timing adjustment of the second node.

In the present embodiment, the first transmission timing may be determined by using multiple modes/types/manners of the OTA/base station timing, specifically which mode/type/manner may be obtained from the synchronization type indication information transmitted by the first node or from the adjustment message. In an exemplary embodiment, the modes/types/manners of the OTA/base station timing may include:

a mode/type/manner of the OTA/base station timing is that the first transmission timing adjustment message is the synchronization adjustment information, where the synchronization adjustment information includes at least one of following adjustment amounts: a first adjustment amount $\Delta T_a$ relative to a downlink receiving timing of a signal transmitted by the first node at the second node, a second adjustment amount $\Delta T_b$ relative to a second transmission timing (e.g., an uplink transmission timing of the second node) of the second node, or a third adjustment amount $\Delta T_c$ relative to a current first transmission timing of the second node, or the third adjustment amount $\Delta T_c$ may also be understood as an amount of change relative to the current first adjustment amount $\Delta T_a$ of the second node.

In the embodiment, the method may further include: mode indication information of the OTA/base station timing transmitted by the first node is acquired, where a mode of the OTA/base station timing indicated by the mode indication information includes at least one of:

mode one where the first transmission timing adjustment message is the synchronization adjustment information;

mode two where the first transmission timing adjustment message is time adjustment information; or mode three where the first transmission timing adjustment message is time adjustment information.

In the embodiment, the mode 1, the mode 2, and the mode 3 refer to following adjustment processes.

In the embodiment, if the mode indication information indicates the mode one and the synchronization adjustment information is the first adjustment amount $\Delta T_a$, an adjustment of the first transmission timing of the second node includes: the downlink receiving timing $T_1$ of the second node is advanced by $\Delta T_a$ to obtain the first transmission timing, where the first transmission timing is $T_1-\Delta T_a$.

Or, if the adjustment mode indication information indicates the mode 1, and the synchronization adjustment information is the second adjustment amount $\Delta Tb$, the step in which the first transmission timing of the second node is adjusted includes: a current second transmission timing $T_2$ is adjusted by $\Delta T_b$ to obtain the first transmission timing, where the first transmission timing is $T_2-\Delta T_b$, and the second transmission timing is a transmission timing for transmission from the second node to the first node.

Or, if the adjustment mode indication information indicates the mode one, and the synchronization adjustment information is the third adjustment amount $\Delta Tc$, the step in which the first transmission timing of the second node is adjusted includes: the current first transmission timing $T_{old}$ is adjusted by $\Delta T_c$ to obtain a new first transmission timing, where the first transmission timing is $T_{old}-\Delta T_c$.

In the embodiment, when the adjustment mode indication information indicates the mode two, the time adjustment information includes one of a timing advance amount TA and a change adjustment amount $\Delta TA$; the change adjustment amount $\Delta TA$ is a change amount relative to a previous timing advance amount TA.

In the embodiment, when the first transmission timing adjustment message is the synchronization adjustment information, the adjustment manner further includes following three manners.

Manner one: if the synchronization adjustment information is the first adjustment amount $\Delta T_a$, the step in which the first transmission timing of the second node is adjusted includes: the downlink receiving timing $T_1$ is advanced according to a numerical value indicated in the first adjustment amount to obtain the first transmission timing, where the first transmission timing is $T_1-\Delta T_a$.

Manner two: if the synchronization adjustment information is the second adjustment amount $\Delta Tb$, the step in which the first transmission timing of the second node is adjusted includes: the current second transmission timing $T_2$ is adjusted by $\Delta T_b$ to obtain the first transmission timing, where the first transmission timing is $T_2-\Delta T_b$.

Manner three: if the synchronization adjustment information is the third adjustment amount $\Delta T_c$, the step in which the first transmission timing of the second node is adjusted includes: the current first transmission timing $T_{old}$ is adjusted by $\Delta T_c$ to obtain the first transmission timing, the first transmission timing is $T_2-\Delta T_c$, or the adjustment amount $\Delta T_{a,\ old}$ of the current first transmission timing is adjusted by $\Delta T_c$ to obtain anew adjustment amount $\Delta T_{a,\ new}=\Delta T_{a,\ old}+\Delta T_c$ of the first transmission timing, where the first transmission timing is $T_1-\Delta T_{a,\ new}$.

In this mode, the second node or terminal uses a traditional timing advance amount TA adjustment information to adjust the second transmission timing, that is, the uplink transmission timing of the second node or terminal.

In addition to the above modes, other modes further include, when the first transmission timing adjustment message is the timing advance amount TA adjustment information, the timing advance amount TA adjustment information includes one of the timing advance amount TA and the change adjustment amount $\Delta TA$; the change adjustment amount $\Delta TA$ is a change amount relative to a previous (i.e., current) timing advance amount TA.

In the embodiment, when the first transmission timing adjustment message is the timing advance amount TA adjustment information, the timing advance amount TA adjustment information includes one of the timing advance amount TA and the change adjustment amount $\Delta TA$; the change adjustment amount $\Delta TA$ is a change amount relative to a previous timing advance amount TA.

Based on when the first transmission timing adjustment message is the timing advance amount TA adjustment information, it further include two modes/types/manners of the OTA/base station timing.

One mode/type/manner of the OTA/base station timing is that: when the timing advance amount TA adjustment information is the timing advance amount TA, that is, if the adjustment mode indication information indicates the mode two, the step in which the first transmission timing of the second node is adjusted according to the TA includes: the downlink receiving timing $T_1$ is advanced according to the numerical value indicated by the timing advance amount TA to obtain the first transmission timing, and the first transmission timing is $T_1-TA-Ta\_offset$, Ta_offset is a pre-configured TA offset; when the time adjustment information is the change adjustment amount $\Delta TA$, the step in which the first transmission timing of the second node is adjusted according to the TA includes: an adjustment is performed according to the change adjustment amount ΔTA and a previous timing advance amount TA to obtain the first transmission timing, where the first transmission timing is $T_1-TA_{old}-\Delta TA-Ta\_offset$, and Ta_offset is a pre-configured TA offset.

In an exemplary embodiment, the first transmission timing is equal to the second transmission timing. Similarly, the second transmission timing of the second node is adjusted according to the above-mentioned timing advance amount TA message.

One mode/type/manner of the OTA/base station timing is that: when the time adjustment information is the timing advance amount TA, that is, if the adjustment mode indication information indicates the mode three, the step in which the first transmission timing of the second node is adjusted may include: the downlink receiving timing $T_1$ is advanced according to a numerical value indicated by the timing advance amount TA so as to obtain the first transmission timing, and the first transmission timing is $T_1-TA/2$; in an exemplary embodiment, the second transmission timing is $T_1-TA-Ta\_offset$, and Ta_offset is a pre-configured TA offset.

When the timing advance amount TA adjustment information is the change adjustment amount ΔTA, the step in which the first transmission timing and/or the second transmission timing of the second node is adjusted according to the TA includes:

the adjustment is performed according to the change adjustment amount ΔTA and the previous timing advance amount TA so as to obtain the first transmission timing, and the first transmission timing is $T_1-(TA_{old}+\Delta TA)/2$. In an exemplary embodiment, a second transmission timing is $T_1-TA_{old}-\Delta TA-Ta\_offset$, and Ta_offset is a pre-configured TA offset.

In the embodiment, when the second node or terminal determines to adopt the OTA/base station timing, the second node or terminal also needs to determine which synchronization timing manner to select to adjust the transmission timing.

In an exemplary embodiment, the synchronization type indication information transmitted by the first node further includes indication information of the mode/type/manner of the OTA/base station timing, a synchronization timing manner is selected to adjust the transmission timing according to the mode/type/manner indicated by the synchronization type indication information, namely, one of the mode/type/manner of the OTA/base station timing is selected.

Or, the first transmission timing adjustment message further includes an indication of the synchronization timing manner, and the indicated timing mode/type/manner is one of the mode/type/manner of the above-mentioned OTA/base station timing.

The step in which the first transmission timing and/or the second transmission timing of the second node is adjusted according to the adjustment information includes: the first transmission timing and the second transmission timing are adjusted according to the synchronization manner selected in the mode/type/manner indicating the OTA/base station timing.

For example, the synchronization timing manner is indicated to adopt the synchronization adjustment information to adjust the transmission timing, during the adjustment, one of the manners in the synchronization adjustment information is selected for adjustment, or even it may directly indicate to select which synchronization adjustment information to adjust by indicating the synchronization timing manner In the embodiment, for the second node or terminal, in a process of using the GNSS timing as the first transmission timing, if the transmission of the GNSS timing is not reliable/unavailable, then the timing synchronization type needs to be changed, and a specific request is made for the superior node to make a simultaneous change, the change steps includes described below.

If it is determined that the GNSS timing is not reliable, then the second node transmits, to the first node, a request for adjusting the timing synchronization type to the over the air (OTA)/base station timing, and the request includes GNSS state information or capability information of the second node itself.

The first transmission timing and/or the second transmission timing are re-adjusted according to the adjusted OTA/base station timing. Optionally, when the first transmission timing adjustment message is the synchronization adjustment information, the first node begins, after receiving the request, to transmit the timing adjustment information for adjusting the first transmission timing to the second node, i.e., begins to transmit the synchronization adjustment information to the second node.

Or, in the embodiment, if the synchronization type indication information indicates the timing synchronization type of the GNSS timing, and it is determined that the GNSS timing is reliable/available, then the second node transmits, to the first node, the request for adjusting the timing synchronization type to the GNSS timing, where the request includes the GNSS state information or capability information of the second node itself. That is to say, if the synchronization type indication information received at the second node is the GNSS, and if the GNSS timing of the second node is not available at the beginning, the second node selects an OTA/base station timing manner to adjust the first transmission timing, but the second node finds afterwards that the GNSS becomes reliable and may be used, then the second node transmits, to the first node, a request message for changing the timing synchronization type, this request message may be pushed in the manner of the GNSS state information or capability information, the request is changed to the GNSS timing.

If the GNSS is adjusted to be the first transmission timing, then the second node may no longer adjust the first transmission timing according to the timing adjustment information transmitted by the first node, that is, the GNSS timing is used as the first transmission timing. Optionally, when the first transmission timing adjustment message is the synchronization adjustment information, the first node may, after receiving the request, no longer transmit the timing adjustment information for adjusting the first transmission timing to the second node, that is, the synchronization adjustment information is stopped to be transmitted to the second node.

In the embodiment, after the synchronization type indication information is received from the first node, the method further includes: the received synchronization type indication information is issued to a subordinate node or terminal, where the subordinate node is the child node of the second node, and the terminal is a subordinate device of the second node.

In some embodiments, when the second node issues the synchronization type indication information, it may be issued in following manners.

One manner is to directly forward the synchronization type indication information transmitted by the first node.

The other manner is that the second node regenerates the synchronization type indication information by itself and transmits it to the subordinate node or terminal. Similarly, the synchronization indication information transmitted to the subordinate node is also embodied in one manner of the GNSS enable flag, the indication timing synchronization type information, or the indication synchronization type priority information.

In addition, the synchronization indication information transmitted to the subordinate node here may further include, if the timing synchronization type is the OTA/base station timing, the synchronization type indication information further includes the indication information of the mode/ type/manner of the OTA/base station timing.

In the embodiment, the second node adjusts the first transmission timing and/or the second transmission timing of the second node itself according to the timing synchronization type indicated in the synchronization type indication information by receiving the synchronization type indication information issued by the first node, and controls the uplink transmission timing of the child node or terminal under the second node, so that the synchronization timing adjustment of the transmission timing among multiple terminals is realized, and so that in a 5G NR, the adjustment mechanism of the transmission timing between the nodes may not have mutual influence when the nodes realize simultaneous receiving or simultaneous transmitting; meanwhile, the data transmission efficiency of the IAB network and the utilization rate of distributed resources are also improved, the requirements of the nodes or the UE may be further better met, and the user experience is improved. The solution is easy to implement and suitable for various different scenes.

Figure 4:
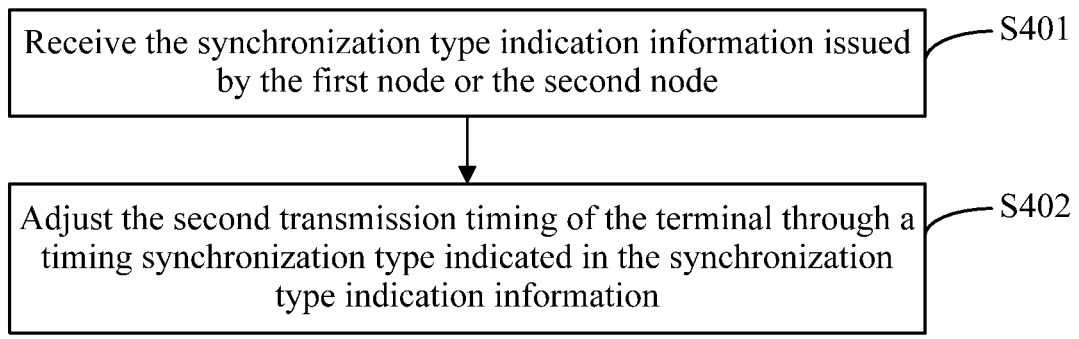
FIG. 4 is a flowchart of a transmission timing determination method based on a terminal side according to an embodiment of the present disclosure.

FIG. 4 is a transmission timing determination method based on a terminal side provided by an embodiment of the present disclosure. In the embodiment, a parent node is referred to as a first node, and a child node under the parent node is referred to as a second node, and a terminal UE disposed under the parent node or a terminal UE disposed under the child node is referred to as a subordinate device. Of course, in the embodiment, there may be multiple terminals. The multiple terminals may all be connected to the parent node or the child node.

In the embodiment, the transmission timing determination method on the terminal side is mainly a process of adjusting a synchronization adjustment timing of the second transmission timing of the terminal according to synchronization type indication information issued by the first node (parent node) or the second node (child node). As shown in FIG. 4, the method may include steps S401 and S402.

In step S401, the terminal receives the synchronization type indication information issued by the first node or the second node.

The synchronization type indication information is used for determining a timing synchronization type currently used by the first node or the second node, and the timing synchronization type includes a global navigation satellite system (GNSS) timing and an (over the air) OTA/base station timing.

In practical applications, not all terminals support a GNSS timing type, but all terminals support an OTA/base station timing type, and in the two timing types, the GNSS timing type is preferred. At this time, in the synchronization type indication information issued by the first node or the second node, the transmission is substantially performed with a highest priority of a GNSS. If the first node or the second node does not support the GNSS, then the synchronization type indication information is transmitted in a priority ranking manner when being transmitted, and meanwhile, support information of the synchronization type indication information is also notified to the terminal, so that a timing between the two is ensured to be normal.

In step S402, the second transmission timing of the terminal is adjusted through a timing synchronization type indicated in the synchronization type indication information.

In the embodiment, the second transmission timing is an uplink transmission timing of the second node, and the timing synchronization type is present in the synchronization type indication information in one of following manners: a GNSS enable flag, information indicating timing synchronization type, or information indicating synchronization type priority.

That is to say, when the first node issues the timing synchronization type, it will select to transmit in following three conditions: 1) a pushing is performed in a manner of the GNSS enable flag, however, this manner generally indicates whether the GNSS is supported or not, if the GNSS is not supported, then the second node may automatically select the OTA/base station type to use; or 2) a corresponding supported type is directly pushed, the corresponding type is selected according to the indication of the type; or 3) a pushing is performed in a priority manner, this priority is preferably in that a support manner of the first node is used as a highest priority, and then the second node selects a manner supported by the second node itself according to the priority sequence so as to synchronously adjust the transmission timing with the first node.

In the embodiment, if the synchronization type indication information indicates the GNSS timing, before the step S402, the method further includes: whether the terminal itself supports the GNSS timing is determined; if supported, then the GNSS timing is used as the timing synchronization type of the terminal for its downlink transmission timing; if not supported, then a request for adjusting the timing synchronization type into the OTA/base station timing is transmitted to the first node or the second node, and the request includes GNSS state information or capability information of the second node itself.

In the embodiment, the terminal adjusts the second transmission timing of the terminal itself according to the timing synchronization type indicated in the synchronization type indication information by receiving the synchronization type indication information issued by the first node or the second node, so that the synchronization timing adjustment of the transmission timing among multiple terminals is realized, and so that in a 5G NR, the adjustment mechanism of the transmission timing between the nodes may not have mutual influence when the nodes realize simultaneous receiving or simultaneous transmitting; meanwhile, the data transmission efficiency of the IAB network and the utilization rate of distributed resources are also improved, the requirements of the nodes or the UE may be further better met, and the user experience is improved. The solution is easy to implement and suitable for various different scenes.

The transmission timing determination method provided by the embodiments of the present disclosure is described in detail below in combination with various application scenarios, which is illustrated by using an IAB network structure shown in FIG. 1 as an example.

Based on the network structure of FIG. 1, in order to ensure that downlink transmissions of all IAB nodes may be synchronized in the IAB network, a simple manner is to enable the all IAB nodes to use absolute time for timing, for example, a satellite system is used for obtaining the timing, such as the GNSS timing, therefore, different IAB nodes may derive a same downlink transmitted frame, sub-frame, slot and symbol serial number and position boundary, it needs to be noted that the synchronization here may be that the frame boundaries, sub-frame boundaries, slot boundaries or symbol boundaries of the timing of the all IAB nodes are aligned, however, the GNSS is not necessarily supported by each IAB, in addition, due to various factors, the GNSS may fail, for example, in severe weather, satellite signals and GNSS timing may not be available, at this time, the base station may still be used for synchronization through over the air interaction. Therefore, when the GNSS timing is considered, a synchronization or a transmission timing determination method of an IAB node may be as described in following examples.

In an example, the network structure is shown in FIG. 1. The network structure includes: a core network; a donor node in wired connection with the core network; as well as an IAB node 1, an IAB node 2 in wireless connection with the donor node; and a terminal UE connected under the IAB node 1 and the IAB node 2.

In the embodiment, it is assumed that the donor node and the IAB node 2 support a GNSS, the IAB node 1 does not support the GNSS, and the donor node determines to use a GNSS timing according to its own decision or network configuration. The control process is as follows.

1) The donor node notifies the IAB node 1 of synchronization type indication information, which may be a GNSS enable flag, or an indication synchronization (source) type (for example, the type may be an OTA/base station, the GNSS), or an indication synchronization priority, and the donor node notifying the enabled GNSS or a method using the GNSS may be that the GNSS-enabled flag is true, or that the synchronization type or highest priority is set to the GNSS.

2) The IAB node 1 obtains the synchronization type indication information, and finds that the donor node is enabled or is using the GNSS timing, but the IAB node 1 does not support the GNSS, therefore the IAB node 1 still needs to be synchronized with the donor node by using an OTA manner; in addition, the IAB node 1 may transmit state or capability information of the GNSS to the donor node, indicates whether the GNSS is supported or whether the GNSS is available, such that the donor node may determine whether to synchronize using OTA processes.

3) At the same time, the IAB node 1 indicates the synchronization type indication information to the child node and the IAB node 2. The IAB node 1 may directly forward the synchronization type indication information transmitted by the donor node, or generate synchronization type indication information by itself and transmit it to the child node, and similarly, it is assumed that the GNSS is enabled in the synchronization indication information transmitted to the child node, although the IAB node 1 cannot use the GNSS timing.

4) The IAB node 2 obtains the synchronization type indication information, and finds that the IAB node 1 enables the GNSS timing and the IAB node 2 supports the GNSS timing. At this time, the IAB node 2 will use the GNSS as the downlink transmission timing without an OTA synchronization process. Similarly, the IAB node 2 may transmit GNSS state information or capability information to the IAB node 1.

In another example, still as shown in FIG. 1 (the scenario of two IAB nodes may be easily extended to scenarios of other hops), it is assumed that the donor node does not enable the GNSS, for example, the timing of using the base station or the OTA manner is indicated in the transmitted type indication information for synchronization, at this time, even if the IAB node 1 supports the GNSS, it is necessary to synchronize with the donor node using the OTA manner, similarly, the IAB node 2 needs to be synchronized with the IAB node 1 using the OTA manner.

In the embodiment, for the terminal, in a process of using the GNSS timing to adjust the transmission timing, if the transmitted GNSS timing is not reliable, then the timing synchronization type needs to be changed. In this case, the terminal needs to request the superior node to make simultaneous changes. The change step may include: if it is determined that the GNSS timing is not reliable, then the terminal transmits a request for adjusting the timing synchronization type to the over the air (OTA)/base station timing to the first node to the first node or the second node, and the request includes GNSS state information or capability information of the second node itself; and the first transmission timing and/or the second transmission timing is readjusted according to the adjusted OTA/base station timing, which will be discussed in following example.

In an example, the network structure is shown in FIG. 1. It is assumed that the donor node and IAB node 2 support the GNSS, IAB node 1 does not support the GNSS, and the donor node determines to use the GNSS timing according to its own decision or the network configuration, as described in the above example, the IAB node 1 will synchronize with the donor node by using the OTA manner to determine the transmission timing; the IAB node 2 will use the GNSS timing.

However, due to various factors, the GNSS timing of the IAB node 2 is no longer reliable. At this time, the IAB node 2 needs to transmit an OTA synchronization request or GNSS state information to the IAB node 1 to request the use of OTA synchronization. Or, the IAB node 1 changes the synchronization type indication information and no longer uses the GNSS, for example, the synchronization type is set to OTA synchronization. At this time, the IAB node 2 also needs to synchronize in the OTA manner so as to determine its own downlink transmission timing.

Or, the network structure is shown in FIG. 1. It is assumed that the donor node, the IAB node 1 and the IAB node 2 all support the GNSS, but the IAB node 1 is not available at the beginning, and the donor node determines to use the GNSS timing according to its own decision or network configuration, as described in the above example, the IAB node 1 will synchronize with the donor node by using the OTA manner to determine the transmission timing; and the IAB node 2 will use the GNSS timing.

If the GNSS timing of the IAB node 1 becomes reliable or available, at this time, the IAB node 1 needs to transmit the GNSS state information to the donor node to request the use of the GNSS timing. At this time, the donor node may stop the OTA synchronization process with the IAB node 1, and the IAB node 1 uses the GNSS to determine its own downlink transmission timing.

In the present disclosure, when the terminal or the IAB node performs synchronization of the transmission timing in the OTA/base station timing manner, it is realized by receiving synchronization adjustment information or time adjustment information, and the synchronization adjustment information or the time adjustment information may be divided into following three adjustment modes.

Mode one: first timing adjustment (advance) message indicates the synchronization adjustment information transmitted by the node in the downlink, for example, indicates an adjustment amount $\Delta T_a$, which is an adjustment amount of the timing (downlink receiving timing) of the node relative to the signal transmitted by the parent node; or indicates an adjustment amount $\Delta T_b$, which is an adjustment amount relative to the second transmission timing of the node; or, indicates an adjustment amount $\Delta T_c$, which is an adjustment amount relative to a current first transmission timing of the node, and may also be said to be an adjustment amount relative to the adjustment amount of a current first timing.

It should be noted herein that if the synchronization adjustment information may uniquely determine the $\Delta T_a$, the $\Delta T_b$ or the $\Delta T_c$, then it is equivalent to indicating the $\Delta T_a$, the $\Delta T_b$ or the $\Delta T_c$. For example, the $\Delta T_a$ is used as an example, if the adjustment information indicates a multiple of the $\Delta T_a$ or a value calculated based on an $\Delta T_a$ operation (for example, adding or subtracting $\Delta T_a$ by a number of symbol lengths), or an index or indicator indicating the $\Delta T_a$, through which a corresponding $\Delta T_a$ may be obtained, and these manners are equivalent to indicating the $\Delta T_a$.

Mode two: the first timing adjustment (advance) message is TA adjustment (advance) information. Specifically, the TA adjustment (advance) information indicates the adjustment amount TA, or indicates the adjustment amount $\Delta TA$, then an first timing adjustment amount is determined as $TA=TA_{old}+\Delta TA$, where $TA_{old}$ is an adjustment amount used before the adjustment message is received, then the first timing is $T_1-TA-TAoffset$, $T_1$ is the timing of the signal transmitted by the parent node at the node (downlink receiving timing), and the above $\Delta T_1$ is TA+TA_offset, where the TA_offset is a pre-configured TA offset.

Mode three: the first timing adjustment (advance) message is TA adjustment (advance) information, specifically, TA adjustment (advance) information indicates the adjustment amount TA, or indicates the adjustment amount $\Delta TA$, then the first timing adjustment amount is determined as $TA=TA_{old}+\Delta TA$, where $TA_{old}$ is the adjustment amount used before the adjustment message is received, then the first timing is $T_1-TA/2$, $T_1$ is the timing of the signal transmitted by the parent node at the node (downlink receiving timing), and the above $\Delta T_1$ is TA/2.

In the embodiment, the mode two is used as an example to illustrate.

As shown in FIG. 1, it is assumed that the downlink transmission timing of the JAB node 1 is the same as the uplink transmission timing, the downlink transmission timing is a timing used when being transmitted to the IAB node 2 or a UE connected to the JAB node 1, and the uplink transmission timing is a timing for transmitting to the parent node (donor node in this scenario). At this time, an uplink transmission TA process may be used to determine the uplink transmission timing, and meanwhile, the downlink transmission timing is also determined.

The donor node will transmit TA adjustment information to the JAB node 1, the TA adjustment information includes two types: one type of TA adjustment (advance) information directly indicates the adjustment amount TA, that is, directly advances the downlink receiving timing according to the indicated value, and the other type indicates the adjustment amount $\Delta TA$, that is, indicates the newly added adjustment amount relative to the previous TA adjustment amount, that is, $TA=TA_{old}+\Delta TA$, $TA_{old}$ is the adjustment amount used before the adjustment message is received, then the first timing, i.e., the downlink transmission timing, is equal to the second transmission timing (i.e., the uplink transmission timing), and is $T_1-TA-TAoffset$, and $T_1$ is the timing of the signal transmitted by the parent node at the node (downlink receiving timing), where TA_offset is the pre-configured TA offset, and this valve may be related to a frequency band or a carrier use manner, it is a value predefined by the system. For example, a valve for an FDD carrier (using a pair of carriers respectively corresponding to the uplink and downlink), the value is changed to 0, and a valve for a TDD carrier (time division duplex, not a pair of carriers) is generally not 0, and is a preset value according to the carrier frequency band protocol. Generally, this value corresponds to the reception and transmission or transmission and reception conversion time of the TDD carrier. That is, finally, the adjustment amount $\Delta T_1$ of the first timing here is TA+TA_offset.

For mode three, as shown in FIG. 1, it is assumed that although the downlink transmission timing of the IAB node 1 is different from the uplink transmission timing, the downlink transmission timing may still be obtained from the TA signaling of the uplink transmission timing adjustment.

The donor node will transmit TA adjustment information to the IAB node 1, the TA adjustment information includes two types: one type of TA adjustment (advance) information directly indicates the adjustment amount TA, that is, directly advances the downlink receiving timing according to the indicated value, and the other type indicates the adjustment amount $\Delta TA$, that is, indicates the newly added adjustment amount relative to the previous TA adjustment amount, that is, $TA=TA_{old}+\Delta TA$, $TA_{old}$ is the adjustment amount used before the adjustment message is received, then the second transmission timing (i.e., uplink transmission timing) described in the above example is still $T_1-TA-TAoffset$, but the first timing, that is, the downlink transmission timing is $T_1-TA/2$, $T_1$ is the timing of the signal transmitted by the parent node at the node (downlink receiving timing), where TA_offset is as described in the above example. That is, finally, the adjustment amount $\Delta T_1$ of the first timing here is TA/2.

In an exemplary embodiment, as shown in FIG. 1, it is assumed that the downlink transmission timing of the IAB node 1 is adjusted and maintained separately, and the TA adjustment signaling is no longer used, that is, new signaling is required, and the second transmission timing is also adjusted in accordance with the methods of the example described above.

The new signaling may indicate the adjustment amount $\Delta T_a$ for the synchronization adjustment information, and the adjustment amount $\Delta T_a$ is an adjustment amount relative to the timing (downlink receiving timing) of the signal transmitted by the parent node at the node; or, the new signaling may indicate the adjustment amount $\Delta Tb$, and the adjustment amount $\Delta Tb$ is an adjustment amount relative to the second transmission timing of the node; or the new signaling may indicate the adjustment amount $\Delta T_c$, and the adjustment amount $\Delta T_c$ is an adjustment amount relative to a current first transmission timing of the node, or may also be said to be an adjustment amount relative to the adjustment amount of a current first timing.

Manner one: if the synchronization adjustment information is a first adjustment amount $\Delta T_a$, then the step in which the first transmission timing of the second node is adjusted according to the TA includes: the downlink receiving timing is advanced according to the value indicated in the first adjustment amount so as to obtain the first transmission timing, and the first transmission timing is $T_1-\Delta T_a$.

Manner two: if the synchronization adjustment information is the second adjustment amount $\Delta T_b$, then the step in which the first transmission timing of the second node is adjusted according to the TA includes: a current second transmission timing is adjusted by $\Delta T_b$ to obtain the first transmission timing, where the first transmission timing is $T_2-\Delta T_b$.

Manner three: if the synchronization adjustment information is the third adjustment amount ΔTc, then the step in which the first transmission timing of the second node is adjusted according to the TA includes: the current first transmission timing $T_{old}$ is adjusted by $\Delta T_c$ to obtain the first transmission timing, the first transmission timing is $T_2-\Delta T_c$, or the adjustment amount $\Delta T_{a,\ old}$ of the current first transmission timing is adjusted by $\Delta T_c$ to obtain a new adjustment amount of the first transmission timing, i.e., $\Delta T_{a,\ new}$ $\Delta T_{a,\ old}+\Delta Tc$, and the first transmission timing is $T_1-\Delta T_{a,\ new}$.

It should be noted here that if the synchronization adjustment information may uniquely determine the ΔTa, ΔTb, or ΔTc, it is equivalent to indicating ΔTa, ΔTb, or ΔTc. For example, taking ΔTa as an example, if the adjustment information indicates a multiple of ΔTa or a basis A value obtained by ΔTa operation (for example, adding or subtracting several symbol lengths to ΔTa), or an index or indicator indicating ΔTa, through which the corresponding ΔTa may be obtained, and these methods are equivalent to indicating ΔTa.

It should be noted herein that if the synchronization adjustment information may uniquely determine the $\Delta T_a$, the $\Delta T_b$ or the $\Delta T_c$, then it is equivalent to indicating the $\Delta T_a$, the $\Delta T_b$ or the $\Delta T_c$. For example, the $\Delta T_a$ is used as an example, if the adjustment information indicates a multiple of the $\Delta T_a$ or a value calculated based on an $\Delta T_a$ operation (for example, adding or subtracting $\Delta T_a$ by a number of symbol lengths), or an index or indicator indicating the $\Delta T_a$, through which a corresponding $\Delta T_a$ may be obtained, and these manners are equivalent to indicating the $\Delta T_a$.

Or, the donor node may transmit OTA adjustment information, that is, the synchronization adjustment information, to the IAB node 1, the OTA adjustment information indicates that the adjustment amount $\Delta T_1$ is the adjustment amount relative to the timing (downlink receiving timing) of the signal transmitted by the parent node at the node; that is, the downlink receiving timing is advanced by $\Delta T_1$ directly according to the indicated value so as to obtain the first transmission timing; or the OTA adjustment information only indicates an adjustment amount relative to a previous OTA adjustment amount, that is, $\Delta T_1$ is only a relative amount, that is, the OTA adjustment information indicates a newly added adjustment amount relative to the previous adjustment amount, and at this time, only the first transmission timing that is currently used needs to be adjusted by $\Delta T_1$, and it may also be considered that the previous adjustment amount is adjusted by $\Delta T_1$; or, the adjustment information indicates an adjustment amount or offset $\Delta T_1$ relative to the currently used uplink transmission timing, i.e., the current second transmission timing (uplink transmission timing) is adjusted by $\Delta T_1$ so as to obtain the first transmission timing.

In an embodiment, the methods in the above embodiments may also be used in combination without violating the principle, for example, a first-type TA adjustment command (directly indicating a value of TA) is used to determine an initial first transmission timing, for example, the first type TA adjustment command is generally used in an access procedure, for example, an adjustment amount $\Delta T_1$ of the initial first transmission timing is TA/2, after which, the first transmission timing may be further adjusted using the dedicated first timing adjustment information, instead of using a second-type TA adjustment command to further adjust the first transmission timing, that is, initial signaling corresponding to the first transmission timing and the second transmission timing is one, but a subsequent tracking adjustment uses respective adjustment signaling.

In the embodiments of the present disclosure, in the manner of the OTA/base station timing, there are the mode one, mode two, and mode three adjustment modes, and there are multiple adjustment manners in each mode, therefore, in the multiple adjustment manners or modes described above, when the network may select multiple OTA manners for synchronization, the parent node must indicate which manner or mode the child node uses, for example, the parent node may indicate its OTA synchronization mode as one of the above embodiments, or another kind, and the child node determines the first timing according to the downlink transmission timing determination method corresponding to the indicated kind. That is, this embodiment is used to explain that the parent node transmits the OTA or the information of the first timing determination manner to the child node. Specifically, it may be indicated by being carried in the synchronization type indication information, or it may be indicated by using the first timing adjustment information. Similarly, if only one OTA/base station timing mode is present in the system or standard, then the first node no longer needs to indicate the manner of the OTA/base station timing mode, and the second node defaults to adopt the only OTA/base station timing mode present in the system or standard. Or the system or the standard sets a default OTA/base station timing mode, and if the mode indication information is not received, the default OTA/base station timing mode is used, and the default OTA/base station timing mode may be one of the above modes one, two, or three.

Figure 9:
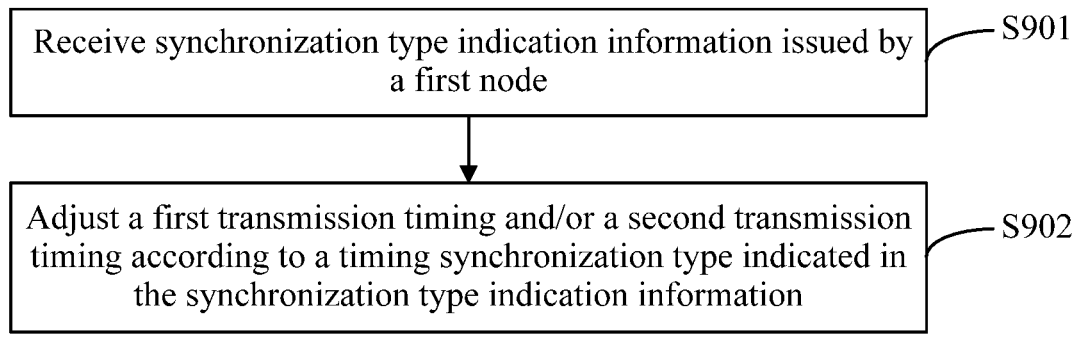
FIG. 9 is another flowchart of a transmission timing determination method according to an embodiment of the present disclosure.

In the embodiments of the present disclosure, the transmission timing determination method described above may also be implemented by directly notifying in a manner of transmitting the synchronization type indication information, as shown in FIG. 9, and the method may include steps S901 and S902.

In step S901, a second node receives synchronization type indication information issued by a first node.

The synchronization type indication information is used for determining a timing synchronization type currently used by the first node, and the timing synchronization type includes a global navigation satellite system (GNSS) timing and an over the air (OTA)/base station timing.

In practical applications, not all nodes or terminals support a GNSS timing type, but all nodes or terminals support an OTA/base station timing type, and of the two timing types, the GNSS timing type is preferred. The synchronization type indication information issued by the first node is basically transmitted with the highest priority of the GNSS. If the first node does not support the GNSS, then the synchronization type indication information is transmitted in a priority arrangement manner, and meanwhile, the support information of the first node itself is informed to the second node or the terminal, so that a timing between the two is ensured to be normal.

In step S902, a first transmission timing and/or a second transmission timing is adjusted according to the timing synchronization type indicated in the synchronization type indication information.

The first transmission timing is a downlink transmission timing of the second node, and the second transmission timing is an uplink transmission timing of the second node.

The timing synchronization type is present in the synchronization type indication information in one of following manners: a GNSS enable flag, information indicating timing synchronization type, or information indicating synchronization type priority.

That is to say, when the first node issues the timing synchronization type, it will select to transmit in following three conditions: 1) a pushing is performed in a manner of the GNSS enable flag, however, this manner generally indicates whether the GNSS is supported or not, if the GNSS is not supported, then the second node may automatically select the OTA/base station type to use; or 2) a corresponding supported type is directly pushed, the corresponding type is selected according to the indication of the type; or 3) a pushing is performed in a priority manner, this priority is preferably in that a support manner of the first node is used as a highest priority, and then the second node selects a manner supported by the second node itself according to the priority sequence so as to synchronously adjust the transmission timing with the first node.

In the embodiment, if the synchronization type indication information indicates the GNSS timing, then before the step S902, the method may further include: whether the second node itself supports the GNSS timing is determined; if supported, then the GNSS timing is used as the timing synchronization type of the second node for its downlink transmission timing; if not supported, then a request for adjusting the timing synchronization type into the OTA/base station timing to the first node is transmitted to the first node, and the request includes GNSS state information or capability information of the second node itself.

In a case where the second node itself supports the GNSS timing, the adjustment of the first transmission timing and the second transmission timing by the second node directly uses the GNSS timing as the first transmission timing or the second transmission timing, or the timing in the GNSS timing is set as the first transmission timing of the second node.

In the embodiment, if the timing synchronization type is the OTA/base station timing, the step in which the first transmission timing and/or the second transmission timing are adjusted according to the timing synchronization type indicated in the synchronization type indication information includes: a timing advance amount TA transmitted by the parent node is received, and the first transmission timing and/or the second transmission timing of the second node is adjusted according to the TA.

In practical applications, in the two manners of the GNSS timing and the OTA/base station timing by the node or the terminal, manners that the transmission timing is adjusted and determined are different, and therefore, in the OTA/base station timing manner, it is further required to receive a timing advance TA for adjusting the transmission timing from a superior node (parent node), and the first transmission timing and/or the second transmission timing of the second node or the terminal is adjusted according to the TA.

In the embodiment, the TA is obtained by receiving a first transmission timing adjustment message, which is issued by the first node and used for indicating the downlink transmission timing adjustment of the second node.

In the embodiment, for the received first transmission timing adjustment message, two cases may be included: the synchronization adjustment information and the timing advance amount TA adjustment information.

When the first transmission timing adjustment message is the synchronization adjustment information, the synchronization adjustment information includes one of following adjustment amounts: a first adjustment amount $\Delta T_a$ relative to a downlink receiving timing of a signal transmitted by the first node at the second node, a second adjustment amount $\Delta T_b$ relative to a second transmission timing of the second node, or a third adjustment amount $\Delta T_c$ relative to a current first transmission timing of the second node.

When the adjustment mode indication information is the timing advance amount TA adjustment information, the timing advance amount TA adjustment information includes one of a timing advance amount TA and a change adjustment amount $\Delta TA$; the change adjustment amount $\Delta TA$ is a change amount relative to a previous timing advance amount TA.

In the embodiment, when the first transmission timing adjustment message is the synchronization adjustment information, the adjustment manner further includes following three manners.

Manner one: If the synchronization adjustment information is the first adjustment amount $\Delta T_a$, the step in which the first transmission timing of the second node is adjusted according to the TA includes: the downlink receiving timing $T_1$ is advanced according to a numerical value indicated in the first adjustment amount to obtain the first transmission timing, where the first transmission timing is $T_1 - \Delta T_a$.

Manner two: if the synchronization adjustment information is the second adjustment amount $\Delta Tb$, the step in which the first transmission timing of the second node is adjusted according to the TA includes: the current second transmission timing is adjusted by $\Delta T_b$ to obtain the first transmission timing, where first transmission timing is $T_1 - \Delta T_b$.

Manner three: if the synchronization adjustment information is the third adjustment amount $\Delta T_c$, the step in which the first transmission timing of the second node is adjusted according to the TA includes: a current second transmission timing $T_2$ is adjusted by $\Delta Tc$ to obtain the first transmission timing, wherein the first transmission timing is $T_2 - \Delta T_c$.

In the embodiment, when the first transmission timing adjustment message is the timing advance amount TA adjustment information, the timing advance amount TA adjustment information includes one of the timing advance amount TA and the change adjustment amount $\Delta TA$; the change adjustment amount $\Delta TA$ is a change amount relative to a previous timing advance amount TA.

Based on when the first transmission timing adjustment message is the timing advance amount TA adjustment information, it further includes two situations: one situation is that the first transmission timing and the second transmission timing are the same, and the other situation is that the first transmission timing and the second transmission timing are different.

When the first transmission timing is equal to the second transmission timing, and when the timing advance amount TA adjustment information is the timing advance amount TA, the step in which the first transmission timing and/or the second transmission timing of the second node is adjusted according to the TA includes described below.

The downlink receiving timing $T_1$ is advanced according to the numerical value indicated by the timing advance amount TA to obtain the first transmission timing, and the first transmission timing is $T_1 - TA - Ta\_offset$, Ta_offset is a pre-configured TA offset.

When the timing advance amount TA adjustment information is the change adjustment amount $\Delta TA$, the step in which the first transmission timing and/or the second transmission timing of the second node is adjusted according to the TA includes described below.

An adjustment is performed according to the change adjustment amount $\Delta TA$ and a previous timing advance amount TA to obtain the first transmission timing, where the first transmission timing is $T_1-TA_{old}-\Delta TA-Ta\_offset$, and Ta_offset is a pre-configured TA offset.

When the first transmission timing is not equal to the second transmission timing, and when the timing advance amount TA adjustment information is the timing advance TA, the step in which the first transmission timing and/or the second transmission timing of the second node is adjusted according to the TA includes described below.

The downlink receiving timing $T_1$ is advanced according to the numerical value indicated by the time advance timing advance amount TA to obtain the second transmission timing, where the second transmission timing is $T_1-TA-Ta\_offset$, and Ta_offset is the pre-configured TA offset, and the second transmission timing is $T_1-TA/2$.

When the timing advance amount TA adjustment information is a change adjustment amount $\Delta TA$, the step in which the first transmission timing and/or the second transmission timing of the second node is adjusted according to the TA includes described below.

An adjustment is performed according to the change adjustment amount $\Delta TA$ and a previous timing advance amount TA to obtain the second transmission timing, where the second transmission timing is $T_1-TA_{old}-\Delta TA-Ta\_offset$, Ta_offset is a pre-configured TA offset, and the second transmission timing is $T_1-(TA_{old}+\Delta TA)/2$.

In the embodiment, when the second node or the terminal determines to use the OTA/base station timing, the second node or terminal further includes: it is necessary to determine which synchronization timing manner to be selected to adjust the transmission timing, the details are as follows.

The first transmission timing adjustment message further includes an indicated synchronization timing manner, and the indicated synchronization timing manner includes: a synchronization manner using the synchronization adjustment information and a synchronization manner using the timing advance amount TA adjustment information.

The step in which the first transmission timing and/or the second transmission timing of the second node is adjusted according to the TA includes: the first transmission timing and/or the second transmission timing is adjusted according to the synchronization manner selected in the indicated synchronization timing manner.

For example, it is indicated, through the indicated synchronization timing manner, to adopt the synchronization adjustment information to adjust the transmission timing, during the adjustment, one of the manners in the synchronization adjustment information is selected for adjustment, or even it may directly indicate to select which synchronization adjustment information to adjust through the indicated synchronization timing manner.

In the embodiment, for the second node or terminal, in a process of adjusting the transmission timing using the GNSS timing, if the transmission GNSS timing is not reliable, then the timing synchronization type needs to be changed, and a specific request is made for the superior node to make a simultaneous change, the change steps includes described below.

If it is determined that the GNSS timing is not reliable, then the second node transmits, to the first node, a request for adjusting the timing synchronization type to the over the air (OTA)/base station timing, and the request includes GNSS state information or capability information of the second node itself.

The first transmission timing and/or the second transmission timing are re-adjusted according to the adjusted OTA/base station timing.

In the embodiment, after the first transmission timing and/or the second transmission timing are adjusted through the timing synchronization type indicated in the synchronization type indication information, the method further includes: the received synchronization type indication information is issued to a subordinate node or a terminal, where the subordinate node is the child node of the second node, and the terminal is a subordinate device of the second node.

In some embodiments, when the second node issues the synchronization type indication information, it may be issued in following manners.

One manner is to directly forward the synchronization type indication information transmitted by the first node.

The other manner is that the second node regenerates the synchronization type indication information by itself and transmits it to the subordinate node or terminal. Similarly, the synchronization indication information transmitted to the subordinate node is also embodied in one manner of the GNSS enable flag, the indication timing synchronization type information, or the indication synchronization type priority information.

Further, a processing manner on the side of the first node is as follows.

The first node determines a timing synchronization type to be used according to its own decision or network configuration, where the timing synchronization type includes a global navigation satellite system (GNSS) timing and an over-the-air (OTA)/base station timing.

The synchronization type indication information carrying the timing synchronization type is issued to the second node or the terminal, the synchronization type indication information is used for adjusting the first transmission timing and/or the second transmission timing of the second node, where the first node is the parent node of the second node; the timing synchronization type is present in the synchronization type indication information in one of following manners: a GNSS enable flag, information indicating timing synchronization type, or information indicating synchronization type priority.

Figure 5:
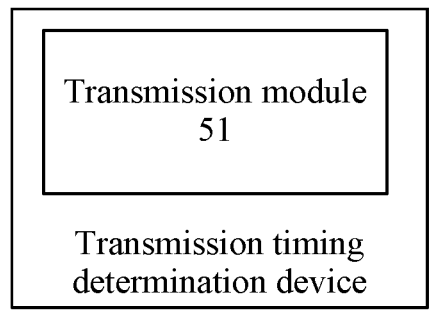
FIG. 5 is a schematic structural diagram of a transmission timing determination device according to an embodiment of the present disclosure.

An embodiment of the present disclosure provides a transmission timing determination device, which may be applied to various base stations or terminals, in particular to a base station with an access-and-return integrated IAB. For this, the device is mainly applied to an apparatus for controlling an transmission timing at the side of an JAB node. As shown in FIG. 5, the device may include a transmission module 51. The transmission module 51 is configured to: issue first timing adjustment information to a second node, where the first timing adjustment information is used for adjusting a first transmission timing of the second node; and/or issue, through the first node, synchronization type indication information to the second node, where the synchronization type indication information includes at least one of a global navigation satellite system (GNSS) timing or an over the air (OTA)/base station timing; the synchronization type indication information is used for determining an adjustment manner of the first transmission timing, the first node is a parent node of the second node, and the first transmission timing is a downlink transmission timing of the second node, and specifically, the timing synchronization type is determined by the first node according to a decision of the first node itself or network configuration, and for steps and specific processes realized by each module in the device, reference may be made to the adjustment process of the uplink and downlink transmission timing shown in each embodiment, which will not be detailed here again.

In the embodiment, the second node may also adjust its second transmission timing according to the timing synchronization type, and the second transmission timing is uplink data transmission time of the second node.

Figure 6:
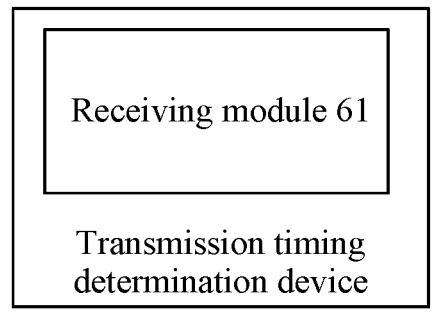
FIG. 6 is another schematic structural diagram of a transmission timing determination device according to an embodiment of the present disclosure.

In the embodiment, when the side of the IAB node receives the synchronization type indication information issued by a superior node donor, it needs to adjust its own uplink and downlink transmission timing according to the synchronization type indication information. For this, the present disclosure further provides a structure of another transmission timing determination device, the device is an apparatus constructed based on a child node, as shown in FIG. 6, the device includes a receiving module 61. The receiving module 61 is configured to: receive first timing adjustment information transmitted by a first node, and adjust a first transmission timing of a second node according to the first timing adjustment information; or use, by the second node, a GNSS timing as the first transmission timing, where the first transmission timing is a downlink transmission timing of the second node. For steps and specific processes realized by each module in the apparatus, reference may be made to the adjustment process of the uplink and downlink transmission timing shown in each embodiment, which will not be detailed here again.

In the embodiment, before the second node receives the first timing adjustment information transmitted by the first node or before the second node uses the GNSS timing as the first transmission timing of the second node, the method further includes: the second node receives the synchronization type indication information transmitted by the first node, determines a timing synchronization type using the GNSS timing and/or determines a timing synchronization type using the OTA/base station timing; and a corresponding adjustment manner of the first transmission timing is determined according to the timing synchronization type.

The step in which the first transmission timing of the second node is adjusted includes: the first transmission timing of the second node is adjusted according to the received first timing adjustment information in the adjustment manner, or the GNSS timing is used as the first transmission timing of the second node.

In the embodiment, the second node may also acquire the timing synchronization type by receiving the synchronization type indication information.

Further, after the timing synchronization type is acquired, it also needs to determine whether the second node itself supports the GNSS timing; if supported, then the GNSS timing is used as the timing synchronization type of the second node on the downlink transmission timing of the second node; if not supported, then a request for adjusting the timing synchronization type into the OTA/base station timing to the first node is transmitted to the first node, and the request includes GNSS state information or capability information of the second node itself.

For the OTA/base station timing, different adjustment manners need to be selected according to a corresponding adjustment amount, as shown in following modes.

Mode one: a first timing adjustment (advance) message indicates synchronization adjustment information transmitted by a node in a downlink manner. Specifically, an adjustment amount $\Delta T_a$ is indicated and is an adjustment amount of a timing (downlink receiving timing) of a signal transmitted by the parent node at the node; or an adjustment amount $\Delta T_b$ is indicated and is an adjustment amount relative to a second transmission timing of the node; or an adjustment amount $\Delta T_c$ is indicated and is an adjustment amount relative to a current first transmission timing of the node, and may also be said to be an adjustment amount relative to an adjustment amount of a current first timing.

Mode two: the first timing adjustment (advance) message is TA adjustment (advance) information, specifically, if the TA adjustment (advance) information indicates an adjustment amount TA or indicates an adjustment amount $\Delta TA$, then a first timing adjustment amount $TA=TA_{old}+\Delta TA$ is determined, the $TA_{old}$ is an adjustment amount used before receiving an adjustment message, then the first timing is $T_1-TA-TA\text{offset}$, $T_1$ is a timing (downlink receiving timing) of a signal transmitted by a parent node at the node, and the above $\Delta T_1$ is TA+TA_offset, where TA_offset is the pre-configured TA offset.

Mode three: the first timing adjustment (advance) message is TA adjustment (advance) information, specifically, the TA adjustment (advance) information indicates the adjustment amount TA, or [indicates the adjustment amount $\Delta TA$, then it is determined that the first timing adjustment amount $TA=TA_{old}+\Delta TA$ is determined, $TA_{old}$ is an adjustment amount used before receiving the adjustment message], then the first timing is $T_1-TA/2$, $T_1$ is the timing (downlink receiving timing) of the signal transmitted by the parent node at the node, and the above $\Delta T_1$ is TA/2.

Figure 7:
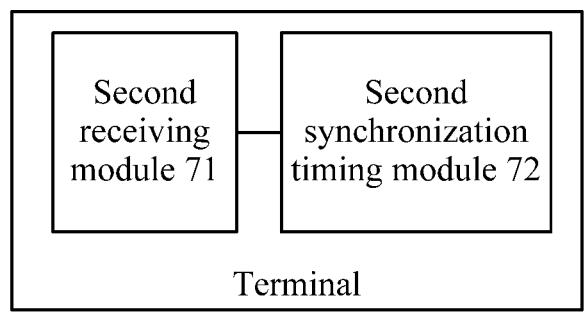
FIG. 7 is a schematic structural diagram of a terminal according to an embodiment of the present disclosure.

Further, an embodiment further provides another terminal that cooperates with the second node or the first node. Referring to FIG. 7, the terminal includes a second receiving module 71 and a second synchronization timing module 72. The second receiving module 71 is configured to receive synchronization type indication information issued by a first node or a second node. The synchronization type indication information is used for determining a timing synchronization type currently used by the first node or the second node, and the timing synchronization type includes a global navigation satellite system (GNSS) timing and an over the air (OTA)/base station timing. The second synchronization timing module 72 is configured to adjust a second transmission timing of the terminal through a timing synchronization type indicated in the synchronization type indication information. For steps and specific processes realized by each module in the terminal, reference may be made to the adjustment process of the uplink and downlink transmission timing shown in each embodiment, which will not be detailed here again.

According to the apparatus provided by the embodiment, the first transmission timing and/or the second transmission timing of the second node itself is adjusted according to the timing synchronization type indicated in the synchronization type indication information by receiving the synchronization type indication information issued by the first node, and controls the uplink transmission timing of the child node or terminal under the second node, so that the synchronization timing adjustment of the transmission timing among multiple terminals is realized, and so that in a 5G NR, the adjustment mechanism of the transmission timing between the nodes may not have mutual influence when the nodes realize simultaneous receiving or simultaneous transmitting; meanwhile, the data transmission efficiency of the IAB network and the utilization rate of distributed resources are also improved, the requirements of the nodes or the UE may be further better met, and the user experience is improved. The solution is easy to implement and suitable for various different scenes.

Figure 8:
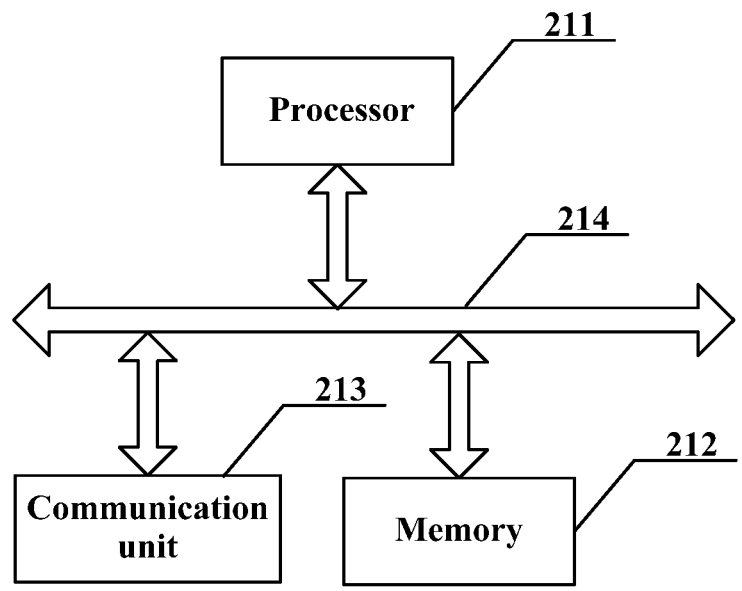
FIG. 8 is a schematic structural diagram of a communication device according to an embodiment of the present disclosure.

An embodiment of the present disclosure provides a communication device. As shown in FIG. 8, the device includes a processor 211, a memory 212, a communication unit 213, and a communication bus 214.

The communication bus 214 is used for implementing a communication connection among the processor 211, the communication unit 213 and the memory 212.

In an instance, the processor 211 is configured to execute one or more first programs stored in the memory, so as to implement steps of the transmission timing determination method in each of the above embodiments.

In another instance, the processor 211 is configured to execute one or more second programs stored in the memory, so as to implement steps of the transmission timing determination method in each of the above embodiments.

In another instance, the processor 211 is configured to execute one or more third programs stored in the memory, so as to implement steps of the transmission timing determination method in each of the above embodiments.

An embodiment further provides a computer-readable storage medium. The computer-readable storage medium includes volatile or non-volatile, removable or non-removable media implemented in any method or technology for storage of information (such as computer readable instructions, data structures, computer program modules or other data). The computer-readable storage medium includes, but is not limited to, a random access memory (RAM), a read-only memory (ROM), an electrically erasable programmable read only memory (EEPROM), a flash memory or other storage technology, a compact disc read-only memory (CD-ROM), a digital versatile disk (DVD) or other optical disk storage, magnetic cassettes, magnetic tapes, disk storage or other magnetic storage devices, or any other medium that may be used for storing desired information and that may be accessed by a computer.

In an example, the computer-readable storage medium in this embodiment may be used for storing one or more first computer programs, and the one or more first computer programs may be executed by one or more processors, so as to implement steps of the transmission timing determination method in each of the above embodiments.

In another example, the computer-readable storage medium in this embodiment may be used for storing one or more second computer programs, and the one or more second computer programs may be executed by one or more processors, so as to implement steps of the transmission timing determination method in each of the above embodiments.

In another example, the computer-readable storage medium in this embodiment may be used for storing one or more third computer programs, and the one or more third computer programs may be executed by one or more processors, so as to implement steps of the transmission timing determination method in each of the above embodiments.

An embodiment further provides a first computer program (or computer software). The first computer program may be distributed on a computer-readable medium and executed by a computable device, so as to implement at least one step of the transmission timing determination method shown in each of the above embodiments; and in some cases, the at least one step shown or described may be performed in a different order from that described in the foregoing embodiment.

An embodiment further provides a second computer program (or referred to as a computer software). The second computer program may be distributed on a computer-readable medium and executed by a computable device, so as to implement at least one step of the transmission timing determination method shown in each of the above embodiments; and in some cases, the at least one step shown or described may be performed in a different order from that described in the foregoing embodiment.

An embodiment further provides a computer program product. The computer program product includes a computer readable apparatus, on which the first computer program, the second computer program, or the third computer program as shown above is stored. The computer-readable apparatus in this embodiment may include the computer-readable storage medium as shown above.

It will be apparent to those skilled in the art that all or some of the steps of the methods, systems, functional modules/units in an apparatus disclosed above may be implemented as a software (which may be implemented in a computer program code executable by a computing apparatus), firmware, hardware, and suitable combinations thereof. The division between functional modules/units mentioned in the above description does not necessarily correspond to the division of physical assemblies in a hardware implementation; for example, a physical component may have multiple functions, or a function or step may be performed cooperatively by several physical assemblies. Some or all of the physical assemblies may be implemented as software executed by a processor, such as a central processor, a digital signal processor, or a microprocessor, or as hardware, or as an integrated circuit, such as an application specific integrated circuit.

Further, it is well known to those of ordinary skill in the art that communication media typically contain computer readable instructions, data structures, computer program modules, or other data in a modulated data signal, such as a carrier wave or other transport mechanism, and may include any information delivery media. Therefore, the present disclosure is not limited to any particular combination of hardware and software.

The foregoing is a further detailed description of embodiments of the present disclosure in connection with exemplary implementations and it is not to be considered that the specific implementation of the present disclosure is merely limited to these descriptions. For those of ordinary skill in the art to which the present disclosure pertains, several simple deductions or substitutions may also be made without departing from the concept of the present disclosure, all of which should be considered as falling within the scope of the present disclosure.

What is claimed is:

1. A transmission timing determination method, comprising:
   issuing, by a first node, first timing adjustment information to a second node, wherein the first timing adjustment information is used for adjusting a first transmission timing of the second node, or
   instructing, by the first node, the second node to use a global navigation satellite system (GNSS) timing as the first transmission timing of the second node;
   wherein the first transmission timing is a downlink transmission timing of the second node; and
   wherein the method further comprises:
   issuing, by the first node, synchronization type indication information to the second node; wherein the synchronization type indication information comprises at least one of: a GNSS enable flag, information indicating a timing synchronization type, or information indicating synchronization type priority, wherein the timing synchronization type comprises at least one of: the GNSS timing or an over the air (OTA)/base station timing; the synchronization type indication information is used for determining an adjustment manner of the first transmission timing, the first node is a parent node of the second node, and the adjustment manner of the first transmission timing refers to the timing synchronization type of the first transmission timing is the GNSS timing or the OTA/base station timing, wherein in a case where the timing synchronization type indicated in the synchronization type indication information issued by the first node comprises the OTA/base station timing, the method further comprises: issuing mode indication information of the OTA/base station timing to the second node, and wherein the mode indication information of the OTA/base station timing is carried in the first timing adjustment information or the synchronization type indication information; or in a case where only the OTA/base station timing is supported by a standard, issuing, by the first node, mode indication information of the OTA/base station timing to the second node, wherein the first node is a parent node of the second node.

2. A communication device, comprising a processor, a memory, a communication unit, and a communication bus;
the communication bus is configured to implement a wireless communication connection among the processor, the communication unit and the memory;
the processor is configured to execute one or more first programs stored in the memory, to implement steps of the transmission timing determination method of claim 1.

3. A non-transitory computer-readable storage medium, storing one or more first computer programs, wherein the one or more first computer programs are executable by one or more processors, to implement steps of the transmission timing determination method of claim 1.

4. A transmission timing determination method, comprising:
receiving, by a second node, first timing adjustment information transmitted by a first node, and adjusting a first transmission timing of the second node according to the first timing adjustment information;
wherein the first transmission timing is a downlink transmission timing of the second node; and
wherein the first node is a parent node of the second node, the first timing adjustment information comprises a timing advance (TA) adjustment command and synchronization adjustment information, wherein the synchronization adjustment information comprises a newly added adjustment amount relative to an adjustment amount used for synchronization based on the timing advance adjustment command, wherein the newly added adjustment amount comprises one of following adjustment amounts: a first adjustment amount $\Delta T_a$ relative to a downlink receiving timing at the second node of a signal transmitted by the first node, a second adjustment amount $\Delta T_b$ relative to a second transmission timing of the second node, a third adjustment amount $\Delta T_c$ relative to a current first transmission timing of the second node, or a fourth adjustment amount $\Delta T_d$ relative to after adjusting a downlink receiving timing at the second node of a signal transmitted by the first node to TA/2 based on the TA adjustment command.

5. The transmission timing determination method of claim 4, wherein prior to receiving, by the second node, the first timing adjustment information transmitted by the first node, the method further comprises:
receiving, by the second node, synchronization type indication information transmitted by the first node, and determining a timing synchronization type using a global navigation satellite system (GNSS) timing and/or a timing synchronization type using the over the air (OTA)/base station timing; and
determining a corresponding adjustment manner of the first transmission timing according to the timing synchronization type, wherein the adjustment manner of the first transmission timing refers to the timing synchronization type of the first transmission timing is the GNSS timing or the OTA/base station timing.

6. The transmission timing determination method of claim 5, wherein the synchronization type indication information comprises at least one of: a GNSS enable flag, information indicating timing synchronization type, or information indicating synchronization type priority.

7. The transmission timing determination method of claim 6, wherein determining the corresponding adjustment manner of the first transmission timing according to the timing synchronization type comprises:
in a case where the timing synchronization type of the GNSS timing is indicated in the synchronization type indication information and it is determined that the second node itself supports the GNSS timing, determining the timing synchronization type using the GNSS timing, and using the GNSS timing as the first transmission timing of the second node; and
otherwise, determining the timing synchronization type using the OTA/base station timing; receiving the first timing adjustment information transmitted by the first node, and adjusting the first transmission timing of the second node according to the first timing adjustment information.

8. The transmission timing determination method of claim 7, further comprising: transmitting GNSS state information or capability information of the second node itself to the first node.

9. The transmission timing determination method of claim 5, further comprising: issuing the received synchronization type indication information to a subordinate node or a terminal, wherein the subordinate node is a child node of the second node, and the terminal is a subordinate device of the second node.

10. The transmission timing determination method of claim 4, further comprising: acquiring mode indication information of an OTA/base station timing transmitted by the first node, wherein a mode of the OTA/base station timing indicated by the mode indication information comprises at least one of:
mode one where the first timing adjustment information is the synchronization adjustment information;
mode two where the first timing adjustment information is time adjustment information; or
mode three where the first timing adjustment information is time adjustment information.

11. The transmission timing determination method of claim 10, wherein,
in a case where the mode indication information indicates the mode one, the adjusting the first transmission timing of the second node is to adjust the first transmission timing according to the mode one, and an adjustment of the mode one comprises one of:
in a case where the synchronization adjustment information is the first adjustment amount $\Delta T_a$, the downlink receiving timing $T_1$ of the second node is advanced by $\Delta T_a$ to obtain the first transmission timing, wherein the first transmission timing is $T_1-\Delta T_a$;

in a case where the synchronization adjustment information is the second adjustment amount $\Delta T_b$, a current second transmission timing $T_2$ is adjusted by $\Delta T_b$ to obtain the first transmission timing, wherein the first transmission timing is $T_2-\Delta T_b$, and the second transmission timing is a transmission timing for transmission from the second node to the first node; or in a case where the synchronization adjustment information is the third adjustment amount $\Delta T_c$, the current first transmission timing $T_{old}$ is adjusted by $\Delta T_c$ to obtain a new first transmission timing, wherein the new first transmission timing is $T_{old}-\Delta T_c$.

12. The transmission timing determination method of claim 10, wherein in a case where the mode indication information indicates the mode two, the time adjustment information comprises one of a timing advance amount TA or a change adjustment amount $\Delta$TA; wherein the change adjustment amount $\Delta$TA is a change amount relative to a previous timing advance amount TA; the adjusting the first transmission timing of the second node is to adjust the first transmission timing according to the mode two, and an adjustment of the mode two comprises one of:

in a case where the time adjustment information is the timing advance amount TA, the downlink receiving timing $T_1$ is advanced according to the timing advance amount TA to obtain the first transmission timing, wherein the first transmission timing is $T_1-TA-Ta\_off$-set, and Ta_offset is a pre-configured TA offset; or in a case where the time adjustment information is the change adjustment amount $\Delta$TA, an adjustment is performed according to the change adjustment amount $\Delta$TA and the previous timing advance amount $TA_{old}$ to obtain the first transmission timing, wherein the first transmission timing is $T_1-TA_{old}-\Delta TA-Ta\_offset$, and Ta_offset is a pre-configured TA offset.

13. The transmission timing determination method of claim 10, wherein in a case where the mode indication information indicates the mode three, the time adjustment information comprises one of a timing advance amount TA or a change adjustment amount $\Delta$TA; wherein the change adjustment amount $\Delta$TA is a change amount relative to a previous timing advance amount TA; the adjusting the first transmission timing of the second node is to adjust the first transmission timing according to the mode three, and an adjustment of the mode three comprises one of:

in a case where the time adjustment information is the timing advance amount TA, the downlink receiving timing $T_1$ is advanced according to the timing advance amount TA to obtain the first transmission timing, wherein the first transmission timing is $T_1-TA/2$; or in a case where the time adjustment information is the change adjustment amount $\Delta$TA, an adjustment is performed according to the change adjustment amount $\Delta$TA and the previous timing advance amount $TA_{old}$ to obtain the first transmission timing, wherein the first transmission timing is $T_1-(TA_{old}+\Delta TA)/2$.

14. A communication device, comprising a processor, a memory, a communication unit, and a communication bus;

the communication bus is configured to implement a wireless communication connection among the processor, the communication unit and the memory;

the processor is configured to execute one or more second programs stored in the memory, to implement steps of the transmission timing determination method of claim 4.

15. A non-transitory computer-readable storage medium, storing one or more second computer programs, wherein the one or more second computer programs are executable by one or more processors, to implement steps of the transmission timing determination method of claim 4.

* * * * *